(12) United States Patent
Hirschmann et al.

(10) Patent No.: US 12,012,986 B2
(45) Date of Patent: Jun. 18, 2024

(54) PRESS-IN NUT AND METHOD FOR PRODUCING A PRESS-IN NUT AND PRESS-IN CONNECTION

(71) Applicant: Richard Bergner Holding GmbH & Co. KG, Schwabach (DE)

(72) Inventors: Markus Hirschmann, Erlangen (DE); Juliane Gersler, Roth-Eckersmuehlen (DE); Klaus Heubusch, Spalt (DE)

(73) Assignee: RICHARD BERGNER HOLDING GMBH & CO. KG, Schwabach (DE)

( * ) Notice: Subject to any disclaimer, the term of this patent is extended or adjusted under 35 U.S.C. 154(b) by 269 days.

(21) Appl. No.: 17/705,982

(22) Filed: Mar. 28, 2022

(65) Prior Publication Data

US 2022/0307542 A1 Sep. 29, 2022

(30) Foreign Application Priority Data

Mar. 29, 2021 (DE) ...................... 10 2021 203 153.6

(51) Int. Cl.
*F16B 37/14* (2006.01)
*F16B 37/00* (2006.01)

(52) U.S. Cl.
CPC ........ *F16B 37/14* (2013.01); *F16B 2037/007* (2013.01)

(58) Field of Classification Search
CPC ........ F16B 37/00; F16B 37/14; F16B 41/005; F16B 2037/007; Y10S 411/91
USPC .......................... 411/427, 429, 430, 431, 432
See application file for complete search history.

(56) References Cited

U.S. PATENT DOCUMENTS

| 1,459,548 | A | * | 6/1923 | Morison | ................. F16B 37/14 29/508 |
|---|---|---|---|---|---|
| 1,509,528 | A | | 9/1924 | Richards | |
| 1,829,972 | A | * | 11/1931 | Wiley | .................... B21K 1/704 29/520 |
| 3,299,933 | A | * | 1/1967 | Akashi | .................... F16B 37/14 29/520 |
| 4,143,578 | A | | 3/1979 | Becker | |
| 4,295,766 | A | * | 10/1981 | Shaw | ..................... F16B 37/14 411/113 |
| 4,479,747 | A | * | 10/1984 | Pagel | ..................... F16B 31/04 411/8 |
| 4,907,924 | A | * | 3/1990 | Hellon | .................... F16B 39/38 411/303 |
| 5,528,812 | A | | 6/1996 | Müller | |

(Continued)

FOREIGN PATENT DOCUMENTS

| DE | 4239583 C2 | 2/1997 |
|---|---|---|
| DE | 102004042478 B4 | 5/2008 |

(Continued)

*Primary Examiner* — Roberta S Delisle
(74) *Attorney, Agent, or Firm* — Muncy, Geissler, Olds & Lowe, P.C.

(57) ABSTRACT

A press-in nut is formed as a cap nut and has a nut body with a through hole, which is closed by a cap under formation of a blind hole. This is provided to obtain a media-tight connection with the nut body. The nut body has a ring collar at the top. In a pre-assembled state, the ring collar is only at least partially bent over, so that the cap is only held captively, without a media-tight connection being formed. The desired media-tight connection is only formed when press-fitting into a component.

15 Claims, 5 Drawing Sheets

(56) References Cited

U.S. PATENT DOCUMENTS

| | | | | |
|---|---|---|---|---|
| 6,220,804 | B1* | 4/2001 | Pamer | F16B 37/068 411/188 |
| 6,935,825 | B2* | 8/2005 | Winker | F16B 37/14 411/533 |
| 10,280,966 | B2* | 5/2019 | Bielecki | F16B 39/12 |
| 10,794,417 | B2 | 10/2020 | Hirschmann et al. | |
| 11,028,868 | B2 | 6/2021 | Hirschmann et al. | |
| 2007/0166128 | A1 | 7/2007 | Nilsen et al. | |

FOREIGN PATENT DOCUMENTS

| | | |
|---|---|---|
| DE | 10307786 B4 | 9/2009 |
| DE | 102014104571 A1 | 10/2015 |
| DE | 102016204619 B4 | 10/2019 |
| EP | 3430277 B1 | 10/2020 |
| GB | 618388 A | 2/1949 |
| GB | 940593 A1 | 10/1963 |
| WO | WO2012127640 A1 | 9/2012 |

* cited by examiner

PRESS-IN NUT AND METHOD FOR PRODUCING A PRESS-IN NUT AND PRESS-IN CONNECTION

This nonprovisional application claims priority under 35 U.S.C. § 119(a) to German Patent Application No. 10 2021 203 153.6, which was filed in Germany on Mar. 29, 2021, and which is herein incorporated by reference.

BACKGROUND OF THE INVENTION

Field of the Invention

The present invention relates to a pre-assembled press-in nut, a method for producing such a pre-assembled press-in nut and for producing a press-in connection comprising a pre-assembled press-in nut.

Description of the Background Art

In a press-in connection, a press-in component, especially a press-in nut, is generally pressed into a metal component, especially sheet metal. In a further assembly process, another component is attached to this via a screw that is screwed into the press-in nut. The press-in nut often has anti-twist elements, so that the press-in nut is held twist-proof on the component. Furthermore, such press-in nuts may have an undercut to prevent them from being pressed out of the component. In some design variants, the anti-twist elements are formed as ribs on the bottom of the press-in nut.

The press-in nut described here can be a self-punching press-in nut, which itself fills the required hole in the component during the press-in process. Alternatively, the component can be pre-perforated, and the press-in nut is pressed into the prepared hole. During the press-in process, a fixing collar formed on the bottom of the press-in nut can be formed such that a form-locking and/or friction-locking connection is formed with the hole edge of the component, or the component is formed in such a way that the material flows from the component into the undercut area of the press-in nut. Alternatively, a press-in nut can also be attached to the sheet metal by buckling the collar.

Press-in components, in particular press-in nuts, can be found, for example, in different variants from the applicant's following property rights: EP 3 430 277 B1 (which corresponds to US 2019/0010973, which is herein incorporated by reference), DE 10 2016 204 619 B4 (which corresponds to US2017/0268553, which is herein incorporated by reference) and DE 10 2004 042 478 B4.

In some areas of application, it is necessary that the assembled connection between the two components be media-tight to a certain extent, especially in the area of the connecting elements press-in nut—screw. Depending on the point of use in the vehicle, different tightness requirements are placed on the connections between screw and press-in nut or press-in nut and component. For example, there may be tightness requirements for liquids such as water, for example in the case of a water channel in the area of the vehicle windows or on the frame of a sunroof or vehicle soft top. The requirements vary from tight against water splashes to tight against water columns of, e.g., 300 mm water column for a duration of 30 minutes. Furthermore, it is advantageous if there is also a tightness against liquid paints, such as those used in the coating process of body components, or against oils. As a result, complex cleaning and post-processing steps after painting can be dispensed with.

In addition, a tightness against gases, such as helium, nitrogen or hydrogen may be required. Such applications are usually defined by a maximum leak rate, for example 1 ml/min at an ambient air pressure of 1 bar. In battery boxes, as they are now increasingly installed in electric vehicles, some connections must be liquid and gas tight.

In order to meet these requirements, it is necessary that on the one hand, the contact surface between nut and component is media-tight. On the other hand, it is necessary that the through hole of the nut, into which the screw is screwed, is also sealed to be media-tight.

One possibility of this is to form the nut in the manner of a cap nut, in which the through hole is closed by a hat-shaped cap in particular. The production of such cap nuts is sometimes complex.

Often the cap nut is made of two pieces. For example, according to DE 103 07 786 B4, it is provided that a hat-shaped cap be placed on a nut body and welded to the nut body. Welding results in a local heat treatment of the nut and the cap, so that the mechanical properties are changed locally in the area of the welded seam with respect to the nut body. Therefore, complex precautions must be taken during welding so that the mechanical properties in the thread area of the nut do not deteriorate from the effect of heat during welding. Additional post-treatment steps may be required to remove weld spatter or to straighten distortion.

GB 618 388 A also discloses a cap nut formed of two parts, in which the nut body has a ring collar, which is bent and thus form-fittingly holds a ring flange of the hat-shaped cap. In this case, the hat-shaped cap is made of plastic and has a wide ring-shaped contour on the bottom. The ring collar is placed around this ring-shaped contour. At the same time, the inside of the ring collar aligns with the nut thread and serves as a thread lock when screwing in the screw.

DE 4 239 583 C2 discloses a press-in nut, in which only a disc-shaped cap is provided for closing the through hole, which is placed on a raised shoulder of the nut body and is fixed by bending a ring collar. Such a press-in nut is comparatively heavy and expensive to produce due to the shoulder on the nut body.

In order to achieve a media-tight connection between the cap and the nut body by forming a ring collar, it is necessary that the ring collar be pressed onto the cap with sufficiently high forces, so that a media-tight connection is formed between the cap and the bent ring collar. However, this is not easily done with press-in nuts, as there are elements on the bottom of the press-in nut that serve for the mechanical attachment of the press-in nut in the component, such as a punched collar, a rivet collar, or ribs to prevent twisting. Due to the high forces that can arise during media-tight press-fitting of the ring collar with the cap, these described elements on the press-in nut would be damaged.

SUMMARY OF THE INVENTION

It is therefore an object of the present invention to provide a media-tight press-in connection with low cost and production effort.

The object is achieved according to an exemplary embodiment of the invention by a pre-assembled press-in nut, a method for producing a press-in nut, in particular a pre-assembled press-in nut, and by a press-in connection between a press-in nut and a component, and a method for forming such a press-in connection.

The pre-assembled press-in nut extends in an axial direction and is designed as a cap nut and for press-fitting into a component. The press-in nut is designed in such a way that it is media-tight in an assembled state, so that it can be used for the formation of a media-tight press-in connection. It has a nut body with a through hole, in which an internal thread is usually formed. The internal thread is usually metrically between M3 and M16 but can also be designed with different thread pitch (fine thread, coarse thread) or different thread type (inch thread). The through hole is closed by a cap in the axial direction under formation of a blind hole. On a surface of the nut body there is a ring collar surrounding the through hole. In an initial state, this extends in the axial direction, i.e., is formed in the manner of a vertically extending ring sleeve. It should be emphasized that the cap of the pre-assembled press-in nut is initially only captively pre-fixed by at least partially bending the ring collar.

The ring collar can be completely bent in the circumferential direction.

The ring collar can be bent in the circumferential direction only at discrete points and thus partially, so that the cap is only prefixed via individual retaining lugs. The ring collar is therefore bent in the circumferential direction only at some positions and not circumferentially. The individual retaining lugs are formed by partial bending of the initially sleeve-shaped ring collar. The retaining lugs are therefore formed only at discrete points by bending and cover an edge area of the cap.

In both variants, therefore, in a first process step, only a captive fastener is formed, so that the press-in nut is provided in a preconfigured state. This preconfigured press-in nut is a commercial and transportable unit, which is intended to be brought from a production site of the press-in nuts, e.g., from a producer of the press-in nuts to a remote assembly location, e.g., to a (different) producer of a press-in connection with such press-in nuts. There, the pre-assembled press-in nut is pressed into a component.

Due to this design, the pre-assembled press-in nut can be produced cost-effectively, especially in large-scale production. As a result, it can also be designed in an installation space-optimized manner and with low weight. In addition, the height of the cap can be easily adjusted for different applications.

The press-in nut is inserted into the component, for example, in large-scale production in a press shop or at individual stations with a stationary or mobile press-in unit. The pre-assembled press-in nuts with the merely pre-fixed cap are usually brought into the press-in position. For this purpose, the press-in nuts are individually fed to a stand-by position, for example via a busbar and/or via a feed hose.

Where "only partially" bent or "slightly" bent are mentioned in the present case, it is understood that the cap with the nut body does not form a media-tight connection, and/or the cap is loosely held, i.e., in particular there is still play between the bent ring collar and the cap and/or the ring collar is not pressed against the cap and in particular not completely circumferentially and/or the ring collar—either around the entire circumference or even just on the discreetly bent retaining lugs—is only oriented diagonally opposite a ring flange of the cap, i.e., the ring collar/the retaining lugs do not rest plan parallel on the ring flange.

Where "media-tight" is mentioned in the present case, a liquid-tight, in particular waterproof and/or gas-tight, in particular airtight connection between the cap and the nut body is meant, for example, for different tightness requirements. As a result, the through hole is sealed media-tight on the cap side.

Generally, different ingress protection classes are subsumed under media-tight. Where "media-tight" is mentioned in the present case, it is understood that at least the ingress protection class with the lowest sealing requirements and preferably also one of the ingress protection classes with higher sealing requirements is fulfilled, as they are defined as follows:

Ingress protection class with the lowest tightness requirements: Connection between cap and nut body is waterproof (i.e., no water passes through the connection) with a water column of at least 300 mm and preferably of 1000 mm.

Ingress protection class with medium tightness requirement: connection between cap and nut body is airtight (airtight: no passage of air (ambient air or nitrogen), or at least the leakage rate of air through the connection is less than 1 ml/min) at a differential pressure of 1 bar (at 20° C.) between the two sides of the connection.

Ingress protection class with high tightness requirement: connection between cap and nut body is gas-tight with respect to hydrogen (i.e., no passage of hydrogen, or at least the leakage rate of hydrogen through the connection is less than 1 ml/min) at a differential pressure of 1 bar (at 20° C.) between the two sides of the connection.

In an example, a press-in nut of the ingress protection class IP67, IP68 or also IP69 according to ISO 20653 ("Road vehicles—Degrees of protection (IP code)—Protection of electrical equipment against foreign objects, water, and access") is sufficient.

The connection between the cap and the ring collar in the pre-assembled state may not be media-tight, for example not airtight, but at the same time the cap and the ring collar can be transferred by press-fitting into a media-tight, in particular airtight connection for the final assembled state.

In the inventive method for preparing such a pre-assembled press-in nut, the nut body is placed on a counter holder, then the cap is placed on the nut body, in particular on a shoulder, i.e., a contact surface for a ring flange of the cap. Thereafter, the ring collar is bent over at least partially, i.e., depending on the variant bent over completely ring-shaped or only partially, in such a way that the cap is only captively fastened, for example via the retaining lugs in the second variant. In this case, a media-tight connection has not yet been formed.

Bending takes place in a first process or forming step with a suitable fixing die. Depending on the variant, this has a ring-shaped or a crenellated die collar. In the first variant, the ring collar is bent around in a ring shape and in the second variant, the ring collar is only bent around the circumference at individual discrete points, so that the retaining lugs are formed to hold the cap in a form-fitting manner.

For the formation of the finished, in particular media-tight press-in nut, a second process or forming step is generally required, in which the ring collar is pressed completely circumferentially against the cap. For this purpose, in particular, a second tool is used, which is not the fixing die.

Preferably, a first forming force is exerted by the fixing die in the first forming process and in the second forming process—in particular a press-in process—a second forming force is exerted, which is greater than the first forming force.

Further, with such a pre-assembled press-in nut, a press-in connection according to the invention is formed. This is characterized by the fact that the ring collar is completely bent over and pressed in completely circumferentially on the cap and the nut is pressed into the component. After only the ring collar was slightly bent over, i.e., partial retaining lugs were formed in the pre-assembled press-in nut, the ring collar is now completely bent over and pressed against the cap, in particular in such a way that a media-tight connection is formed. In the second variant with the retaining lugs, therefore, the intermediate segments of the ring collar, which previously extended mainly in the axial direction, are also bent. The entire ring collar is pressed all around onto the cap.

Therefore, a media-tight connection between the cap and the ring flange and thus the nut body is formed. In the pre-assembled press-in nut, on the other hand, there is no media-tight connection between the ring collar and the cap yet.

This solution concept according to the invention is based on the consideration of dividing the connection between cap and nut body into two process steps, wherein the media tightness is produced only in the second process step. This has the particular advantage that in the first process step, in which only a captive pre-fixing between the nut body and the cap is formed, comparatively low forming forces are to be exerted, so that damage to the special elements, in particular ribs, on the bottom of the nut body is reliably avoided.

Especially when arranging ribs and the punch collar or rivet collar on the bottom of the nut body for anti-twist or compression protection, it is necessary that these are not damaged during the process of fixing the ring collar. Therefore, in order to avoid such damage, which would occur with high fixing forces in the case of a single-stage fixing process, a counter holder on which the nut body rests during the fixing process would have to have recesses for such ribs. In addition, the nut body would have to be brought into a defined rotational orientation so that the ribs engage in the recesses. However, both the provision of such a specially designed counter holder and in particular the exact rotational orientation of the press-in nut are very complex and cost-intensive. In the procedure described here for the formation of the pre-assembled press-in nut, therefore, no special rotational orientation is required. Preferably, the counter holder also has a smooth contact surface on which the press-in nut rests with its bottom, i.e., rests on the ribs or the rivet collar/compression collar/punched collar/press-in collar/outer collar. Furthermore, several of these above-mentioned fixing features can also rest on the counter holder.

A pre-assembled press-in nut is generally understood in the present case to be the press-in nut as such, i.e., a loose structural element before being pressed into the component.

The cap can be formed as a hat-shaped cap, which has a ring flange, with which it rests on a corresponding shoulder of the nut body. The cap is preferably thin-walled to save weight. The cap is produced using large-scale processes such as deep drawing of sheet metal or injection molding of plastic.

In general, the nut body has a bottom for support on the component. On this bottom, ribs are formed in a preferred embodiment for anti-twist protection. These typically extend in a radial direction. They preferably extend to the outermost edge of the nut body. Alternatively, a circumferential outer collar is formed at the outer edge of the bottom and the ribs extend to this outer collar. The outer collar itself rests on the surface of the component during the press-in connection or penetrates only minimally into the component surface. The nut body also generally has a circumferential fixing collar on its bottom, which is intended for fixing the press-in nut in the component. This fixing collar can be deformed during the press-in process and for forming the press-in connection. Different variants are known. Alternatively, only a press-fitting of the fixing collar within the component and/or a radial expansion takes place, but without the fixing collar projecting beyond the bottom of the component.

The ring collar on the top of the nut body for attaching the cap may only be slightly bent, either completely circumferentially or distributed only in some places around the circumference, so that only the captive pre-fixation is achieved. Typically, for example, the ring collar or the retaining lugs are only oriented diagonally to the ring flange.

The fixing process for the formation of the pre-fixation can be designed in such a way that only a small fixing die force and thus forming force, in particular ring-shaped, is exerted on the ring collar by means of the fixing die. In this case, the ring collar is slightly radially bent inwards, in particular in such a way that the ring collar with the ring flange of the cap forms a form fit for captive fastening which is effective in the axial direction, preferably without the ring collar coming to rest on the ring flange or being pressed against it.

In an example with retaining lugs, these are bent to attach the cap to the top of the nut, preferably without being sheared off from remaining intermediate segments of the ring collar between two adjacent retaining lugs, not even partially. The fixation process for the formation of the retaining lugs is therefore designed in such a way that damage to the ring collar is avoided. Thus, there is no tearing, and no cracks are formed in the ring collar. After forming the retaining lugs, the ring collar is therefore formed by the horizontally oriented retaining lugs and intermediate segments arranged in between, which are oriented vertically or obliquely to the axial direction. The horizontal retaining lugs and the intermediate segments merge continuously into each other.

Overall, after the forming of the retaining lugs, a preferably roughly wavy, at any rate continuously circulating ring collar can be formed.

Preferably, 3-10 retaining lugs are formed around the circumference. The retaining lugs are preferably evenly distributed around the circumference. Furthermore, a respective retaining lug preferably only sweeps over an angular range of 10° to 25° or also from 10° to a maximum of 40°.

Overall, the comparatively small retaining lugs and the large intermediate segments ensure that only low fixing forces are required.

The required forming force and thus the fixing die force, i.e., the force exerted by the fixing die to pre-fix the cap in the first process step, is comparatively low and is preferably between 5 kN and 30 kN. Since the fixing die force is so low, there is no damage to the bottom of the press-in nut and no cracks are formed in the ring collar. After the captive pre-fixing, the ring collar, or the retaining lugs preferably only project slightly radially inwards, so that the cap is secured against falling out of the top of the nut.

The second forming force exerted in the second process step can be significantly higher, for example by at least a factor of 2 or at least a factor of 5 or a factor of 10 higher than the forming force exerted in the first process step. Preferably, the second forming force is in the range between 35 kN and 350 kN.

The second process step is preferably not carried out until the press-in connection is formed. In the second process step, the ring collar is further bent and pressed in against the cap with a press stamp.

In the formation of the press-in connection, it should be emphasized in summary that the media-tight connection is preferably not formed until the press-in process takes place.

The press-fitting of the ring collar onto the cap can take place at the same time as the nut is pressed into the component. This means that with a press-in die, with which the press-in nut is pressed into the component, the ring collar is also completely pressed onto the cap at the same time. The (press-in) force exerted by the press-in punch to press the press-in nut into the component therefore forms the second forming force. In particular, this is transmitted at least partially and preferably exclusively via a press ring of the press-in die, with which at the same time the ring collar is pressed tightly onto the cap. This has the advantage that the cap is not damaged, and the same press-in die can be used for caps of different height. Furthermore, it should be emphasized that the press-in die force exerted by the press-in die is higher than the fixing die force exerted by the fixing die, which is exerted to form the captive pre-fixing or the retaining lugs. Typically, the press-in forces are between 35 kN and 350 kN.

The concept described here is generally suitable for press-in nuts of any design. Both for self-punching nuts and for press-in nuts that are pressed into holes of a pre-perforated component. Press-in nuts with punching function are used for components without a pre-hole. The nut body has ribs at the bottom and a fixing collar with a punching edge. When press-fitting into the component, the press-in nut punches the pre-hole itself. Such press-in nuts can be designed on the bottom both with an outer collar and without an outer collar. The variant without an outer collar can also be designed with a displacement bar between the fixing collar and ribs. With such self-punching press-in nuts, the die is designed with a die joining contour, which is arranged raised in a ring-shape, at the top. Furthermore, such dies have a through hole for the removal of the punched piece. In addition to components without a pre-hole, press-in nuts of the type described above can also be pressed into components with a pre-hole. In this case, the fixing collar remains without a punching function. The attachment of a non-self-punching press-in nut into a pre-perforated component is carried out either by forming a collar (rivet nut), radial expansion of a collar (especially in the case of high- and ultra-high-strength steels with tensile strengths between 600 $N/mm^2$ and 2,000 $N/mm^2$) or by forming the component in undercut areas of the nut, in particular when used in aluminum alloys, copper alloys or steels with tensile strengths of less than 600 $N/mm^2$. These are steel nuts with a defined strength class, which usually meet the mechanical strength properties according to DIN EN ISO 898-2. For applications in aluminum, magnesium or copper, the nuts can also be made of aluminum.

The cap can be thin-walled and weight-saving. It is either made of sheet steel with a wall thickness between 0.3-1.0 mm, preferably 0.5 mm or made of plastic. The steel sheet can be made into a cap shape, e.g., by means of a deep-drawing process. The steel sheet is usually coated for corrosion protection reasons, preferably galvanized. The advantage of these caps is that the cap, which is already protected against corrosion, is pre-fixed on a steel nut coated with a zinc surface and the subsequently very complex coating process in a hollow body closed on one side is omitted. Furthermore, it is of course possible to coat both cap and nut afterwards. For the plastic version of the cap, e.g., injection molding is a suitable production technique.

The cap can be designed cost-effectively and easily in different heights. As a result, different variants of pre-assembled press-in nuts can be produced quickly and easily by pre-fixing caps of different heights on the same nut bodies. Due to a higher cap, e.g., longer screws can later be screwed into the nut without affecting media tightness.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A pre-assembled press-in nut 2 shown in FIGS. 1-5 is designed as a cap nut. It has a nut body 4 and a cap 6 connected to this, which is formed in the embodiment as a hat-shaped cap 6.

Figure 1:
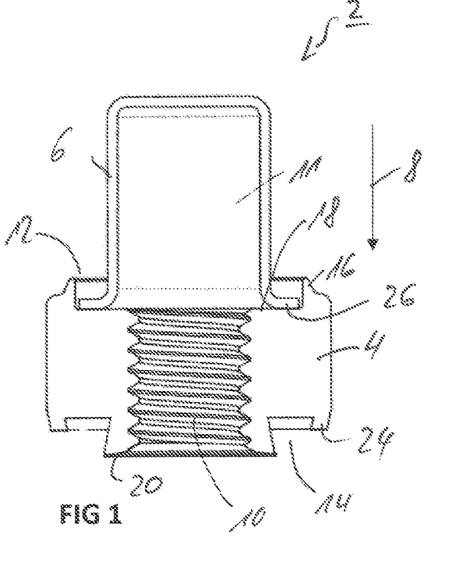
FIG. 1 is a section view of a press-in nut with nut body and attached cap prior to the fixing process for captive fixation of the cap.

The press-in nut 2 extends in the axial direction 8 from an upper end to a lower end. The nut body 4 has a through hole 10, which is provided with an internal thread. The through hole is limited by the cap 6, upwards against the axial direction 8 and a blind hole 11 is formed.

The nut body 4 extends in the axial direction 8 from a top 12 to a bottom 14. At the top 12, a ring collar 16 is formed on the front side of the nut body 4, which is oriented vertically in the initial state and thus parallel to the axial direction 8. At the top 12, a circumferential shoulder 18 is formed around the through hole 10, which extends to the ring collar 16.

At the bottom 14 there is a fixing collar 20 and ribs 22 serving as anti-twist elements. The ribs 22 can also be taken from the FIGS. 10A-10C, 10E. Furthermore, in the embodiment at the outermost edge of the circumference at the bottom 14, a circumferential outer collar 24 is formed. The ribs 22 extend in a radial direction starting from the fixing collar 20 to the outer collar 24. In the embodiment, the ribs 22 are evenly distributed around the circumference. Typically, about 4-12 ribs 22 are formed, and in the embodiment, 8 ribs 22 are formed. Their height in the axial direction 8 is preferably lower than that of the outer collar 24.

The cap 6 generally has a ring flange 26, which is designed continuously circumferentially. In the pre-assembled state, this rests on the shoulder 18 of the nut body 4. In the embodiment, the cap 6 has a cylindrical body, which is closed on its upper side via a floor section. At the opposite end, the ring flange 26 is formed. This is oriented in a horizontal direction.

The nut body 4 and the cap 6 are two initially loose components, which are connected to each other to form the pre-assembled press-in nut 2. The cap 6 is held captively on the nut body 4 over the ring collar 16. The latter is in particular circular ring shaped and extends, prior to the fixing process, counter to the axial direction 8.

Figure 7:
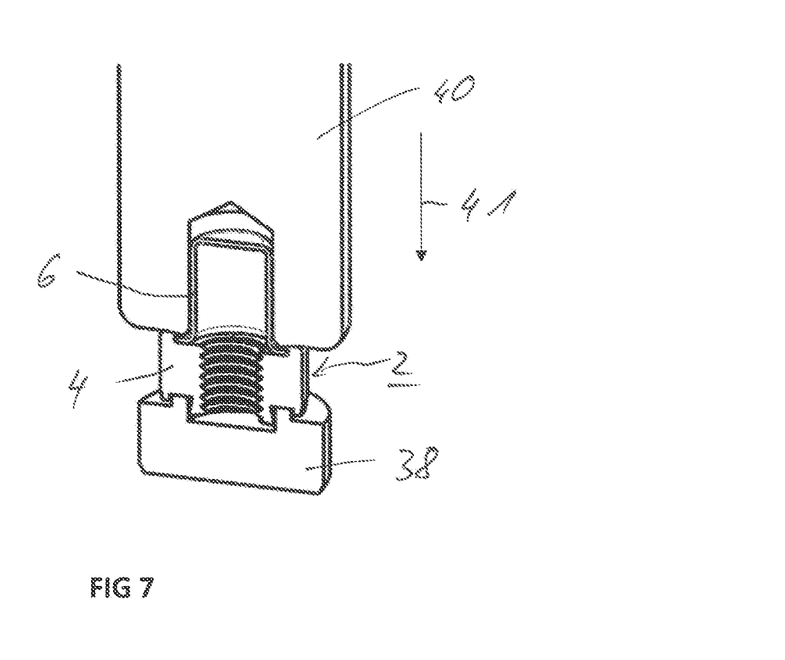
FIG. 7 is a section view with the press-in nut similar to FIG. 1 and with a fixing die as well as a counter holder to illustrate the first process step of fixing the cap.

For the captive fixing of the cap 6 in a first process step, the ring collar 16 is bent either ring-shaped or partially with the help of a fixing die 40 and a first forming force 41 (fixing die force) exerted by it.

Figure 8A:
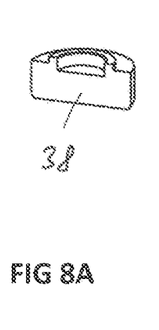
FIGS. 8A-8E show various illustrations explaining the method for producing the pre-assembled press-in nut.
Figure 8B:
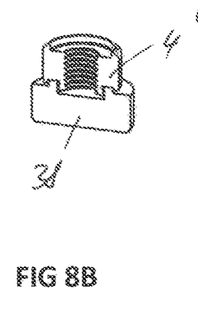
Figures 8C, 8D, 8E:
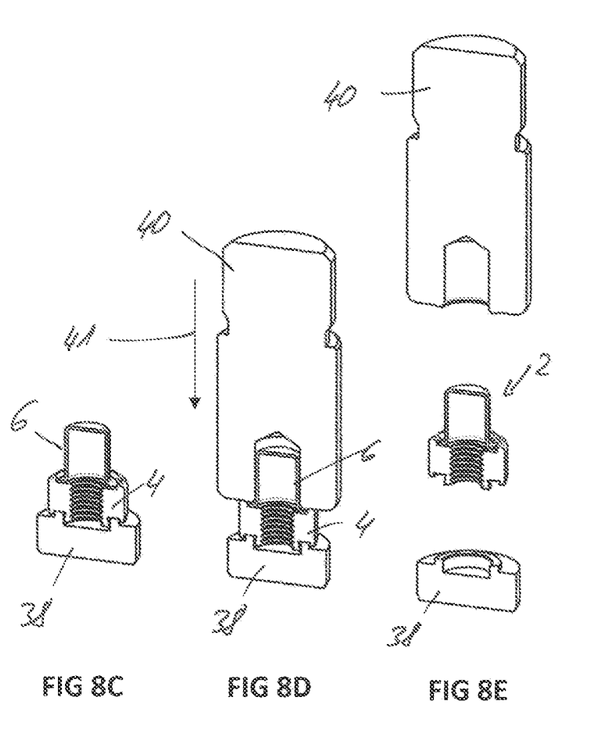

According to the first variant, the ring collar 16 is pressed radially inwards during the fixing process from the initial state over the entire ring collar 16 by means of the fixing die 40 and the first forming force 41 (see FIG. 7 and FIG. 8D). Due to this fixing process, the ring collar 16 now slightly projects beyond the outer diameter of the ring flange 26 of the cap 6 and thus captively holds the cap 6 on the nut body 4.

Figure 4:
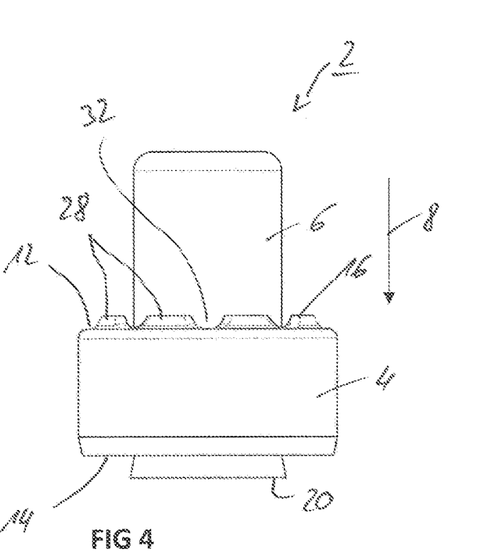
FIG. 4 is a side view of a pre-assembled press-in nut with retaining lugs
Figure 5:
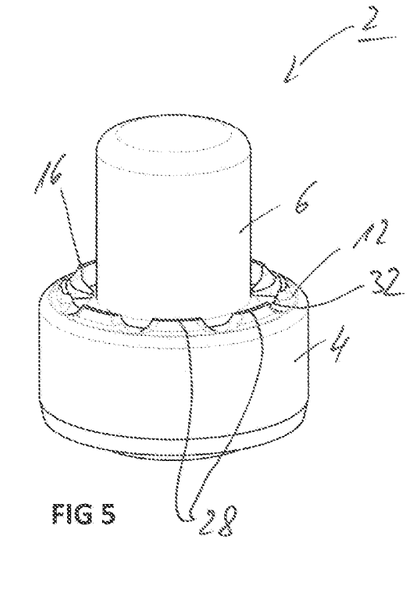
FIG. 5 is a diametric view of a pre-assembled press-in nut with retaining lugs.

According to the second variant, the ring collar 16 is only partially bent during the fixing process. As a result, retaining lugs 28 are formed. The cap 6 is held captively on the nut body 4 via these retaining lugs 28. In particular, these are arranged equally around the circumference. Between two adjacent retaining lugs 28, an intermediate segment 32 is formed. In the area of the intermediate segment 32, unlike with the retaining lugs 28, no form-fitting securing of the cap 6 is typically formed. The intermediate segments 32 do not rest on the ring flange 26 and preferably do not overlap it. The retaining lugs 28 are formed by the fixing process (first forming process, first process step), in which partial areas are bent downwards from the ring collar 16 vertically oriented in the initial state, which form the retaining lugs 28.

With this pre-assembled press-in nut 2, in this way, the cap 6 is therefore attached to the nut body 4 in a captive manner. However, no media-tight connection has yet been formed between cap 6 and nut body 4.

Such a pre-assembled press-in nut 2 is provided in a first process step and typically delivered to a remote assembly location for further assembly in a second process step.

With such a pre-assembled press-in nut 2, a press-in connection 34 (cf. FIG. 9C) between the press-in nut 2 and a, particularly metal, component 36 is formed in the second process step, which is in particular a sheet metal component. Furthermore, metal castings and extrusion profiles are conceivable.

This press-in connection 34 is characterized in the finished state by the fact that the ring collar 16 is completely pressed in circumferentially on the ring flange 26 of the cap 6 (cf. FIG. 6), so that in particular a media-tight connection is formed between ring collar 16 and ring flange 26. The ring flange 26 is therefore pressed in between the shoulder 18 and the ring collar 16. This means that in the finished state no medium can pass through the through hole 10, as this is now sealed to be media-tight by the blind hole 11.

Figure 6:
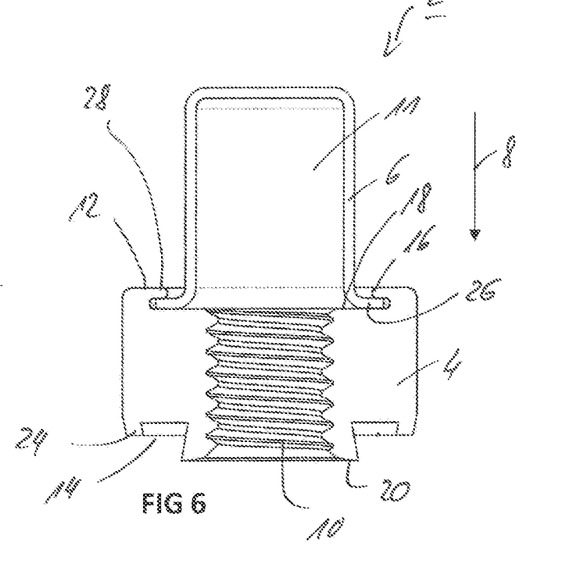
FIG. 6 is a section view of a press-in nut after a second forming process, in which a media-tight connection is formed between the cap and the nut body.

The two process steps for the formation of the pre-assembled press-in nut 2 on the one hand and the press-in connection 34 on the other hand are explained in more detail using FIGS. 6, 7, as well as 8A to 8E and 9A to 9C.

In the first process step for the formation of the pre-assembled press-in nut 2, the nut body 4 is first placed on a counter holder 38. This has a top with an upper counter surface or contact surface, which is formed by a ring-shaped collar. In the embodiment, this ring-shaped collar engages in the space between the mounting collar 20 and the surrounding outer collar 24. Of particular importance is that this contact surface, i.e., the frontal surface of the counter holder 38, is smooth. The individual ribs 22 therefore rest on this smooth contact surface. Furthermore, it is also possible that the counter holder 38 has only a smooth contact surface with a central recess in which the mounting collar 20 can be immersed.

Figure 2:
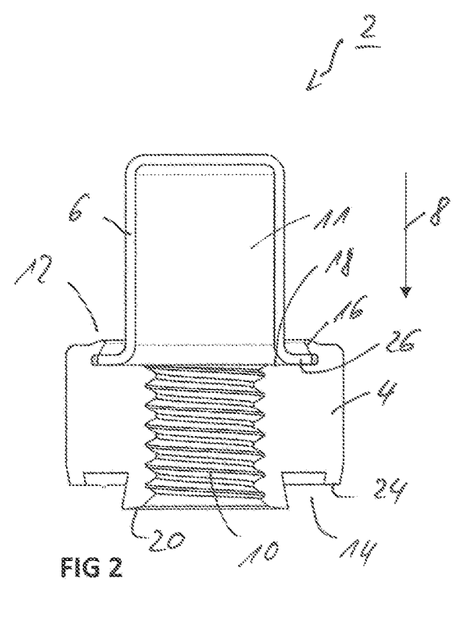
FIG. 2 is a section view of a ring-shaped pre-assembled press-in nut after the fixing process.
Figure 3:
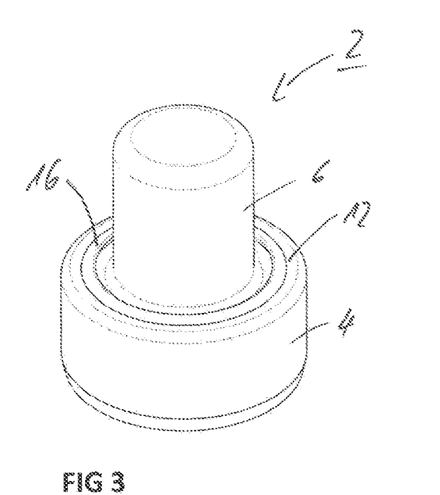
FIG. 3 is a diametric view of a ring-shaped pre-assembled press-in nut.

In the next step, the cap 6 is placed on the nut body 4. With the help of the fixing die 40 and the first forming force 41, the ring collar 16 is then pressed in radially, circularly, slightly inwards in order to captively hold the cap 6 on the nut body 4 (FIGS. 2, 3).

Alternatively, the individual retaining lugs 28 are selectively formed. On its bottom, the fixing die 40 has die lugs distributed around the circumference in a manner not specified here, which protrude downwards in the axial direction 8. These are preferably rounded towards their edge sides (in the circumferential direction) and not sharp-edged, so that in the fixing process the retaining lugs 28 and the intermediate segments 32 are formed without the ring collar 16 tearing and being damaged. After this fixing process, the press-in nut 2 shown in FIGS. 4 and 5 is obtained.

Figures 9A, 9B:
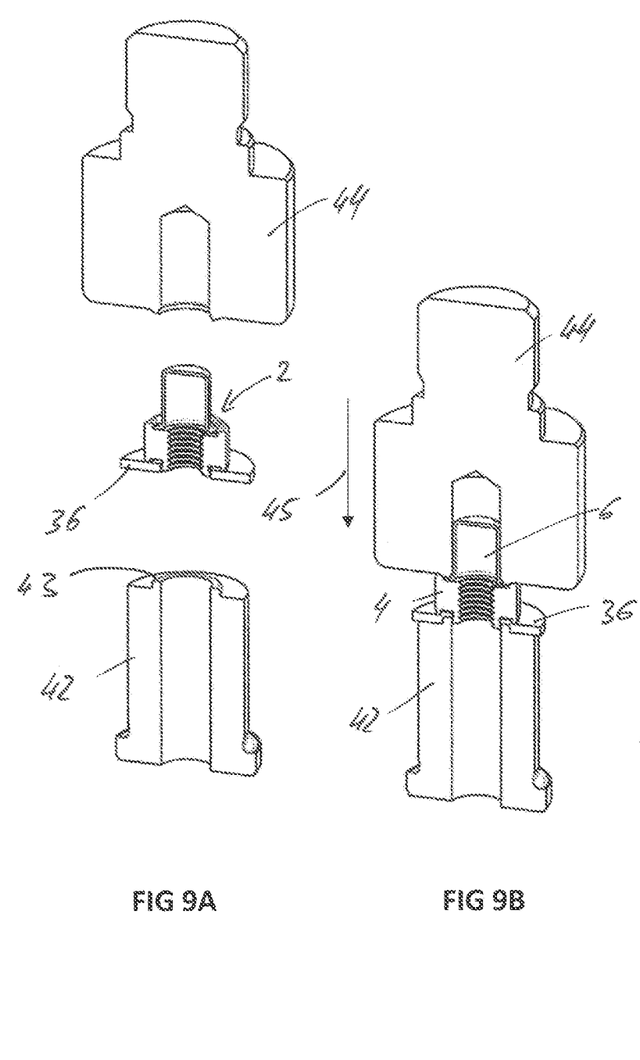
FIGS. 9A-9C show various illustrations explaining the method for producing the press-in connection.
Figure 9C:
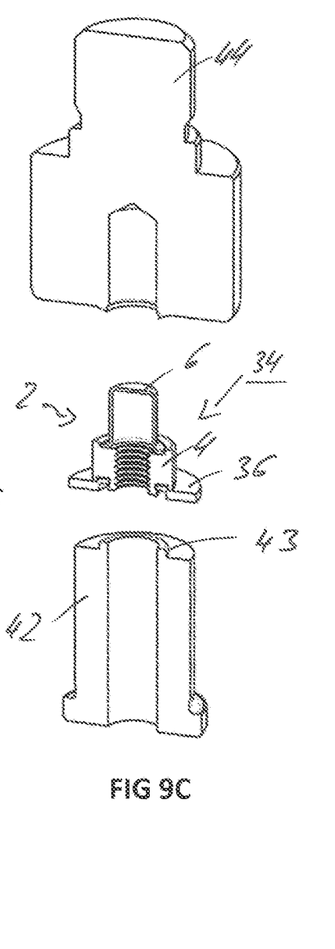

For the formation of the press-in connection 34, as it is explained in particular with respect to FIGS. 9A to 9C, the second process step proceeds as follows:

The component 36, in the embodiment a pre-perforated sheet, is placed on a die 42. In the embodiment, the die 42 has an upward-oriented joining contour 43. This has a ring-shaped ridge, which is surrounded by a flat, ring-shaped contact surface on which component 36 is placed. Subsequently, the press-in nut 2 is placed from above and is pressed into the component 36 with a second (forming) force 45, herein also referred to as press-in force, with the help of a press-in die 44. Within a (single) press-in stage, the usual deformation of the fixing collar 20 for forming the connection with the component 36 also takes place. As a result, the ribs 22 are also pressed into the top of the component 36 for anti-twist protection.

At the same time, the ring collar 16 is completely pressed against the ring flange 26 of the cap 6 during this press-in process. Due to the second forming force 45 exerted by the press-in die 44, the ring collar 16 is pressed against the ring flange 26 in such a way that a media-tight connection is created between cap 6, ring flange 26 and between ring collar 16 and shoulder 18. For the variant with retaining lugs 28 this means that on the one hand the intermediate segments 32 are bent over and on the other hand both the intermediate segments 32 and the prepared retaining lugs 28 are pressed against the ring flange 26 of the cap 6 by the second (press-in) force 45 that is exerted by the press-in die 44, whereby the media-tight connection is formed. The press-in die 44 may also be designed with an additional bevel that ensures the media-tight formation of the ring collar 16 (see FIGS. 9A-9C).

FIGS. 10A to 10E shows different press-in nuts, which are examples but not conclusively applicable for the concept of the invention.

FIGS. 10A to 10E show—from top to bottom—a top view of the bottom of the press-in nut 2 representing a cutting plane, a side view, again the top view on the bottom and a section view along the cutting plane shown in the top image display.

Figure 10A:
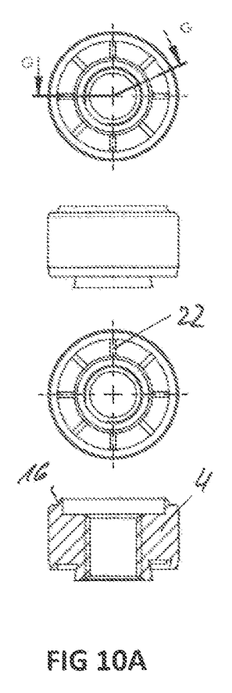
FIGS. 10A-E show various press-in nuts.
Figure 10B:
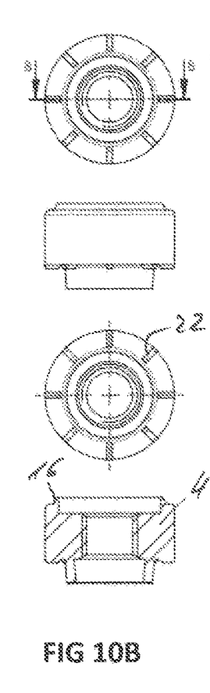
Figure 10C:
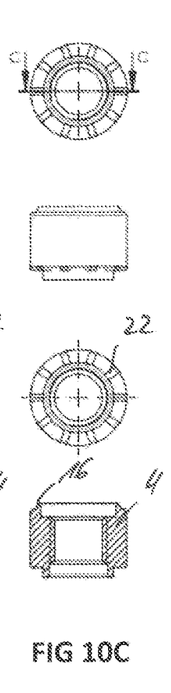
Figure 10D:
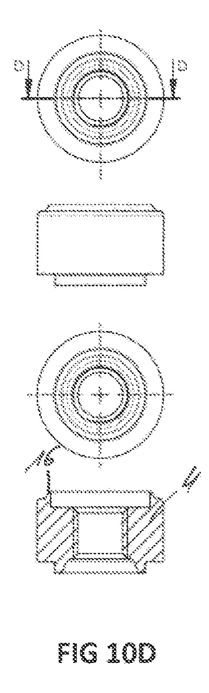
Figure 10E:
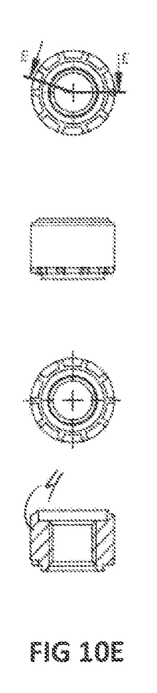

Press-in nuts 2 with punching function, as shown in FIGS. 10A and 10E, can be pressed into a component without a pre-hole. The nut body 4 has ribs 22 on its bottom 14 and a mounting collar 20 with a punching edge. When press-fitting into the component, the press-in nut 2 punches the pre-hole itself.

The press-in nut 2 with punching function can be designed on the bottom 14 both with an outer collar 24 and without an outer collar. The variant without an outer collar can also be designed with a displacement bridge between mounting collar 20 and ribs 22.

The die 42 for the press-in nuts 2 with punching function has the die joining contour 43 at the top, which is ring-shaped. Within the raised, ring-shaped die joining contour 43 is a through hole for the removal of the punched piece during self-punching processing of the press-in nut 2.

In addition to being pressed into components without a pre-hole, press-in nuts 2 of this type can also be pressed into components with a pre-hole. In this case, the mounting collar 20 does not have a punching function.

Usually, these press-in nuts 2 are pressed into components made of steel, aluminum, copper, or magnesium.

Press-in nuts 2 with a rivet function, as shown in FIGS. 10B-10C, are pressed into a component with a pre-hole. The nut body 4 has ribs 22 and a mounting collar 20 on its bottom 14. The mounting collar 22 is bent towards the edge of the hole during the press-in into the component. Usually, the mounting collar 22 does not project beyond the bottom of the component after bending.

The top of the die 42 for the press-in nuts 2 with rivet function has a die joining contour 43 in the form of a truncated cone.

Usually, these press-in nuts 2 are pressed into components made of steel, aluminum, copper, or magnesium.

Press-in nuts 2 with a compression collar, as shown in FIG. 10D, are pressed into a component with a pre-hole. The mounting collar 20 on the bottom 14 of the nut body 4 is pressed by compression molding into the component in the direction of the edge of the hole, so that a press fit results between the compression-molded compression collar and the high-strength steel component. Anti-twist features in the form of ribs or knurls are not provided in this nut variant.

The top of the die 42 for the press-in nuts 2 with rivet function has a die joining contour 43 in the form of a truncated cone.

Usually, these press-in nuts 2 are pressed into steel components with a tensile strength greater than 600 N/mm$^2$ up to 2000 N/mm$^2$. In this case, high-strength refers to steels with a tensile strength greater than 600 N/mm$^2$, in particular greater than 1000 N/mm$^2$ up to 2000 N/mm$^2$. It can be used in both cold and hot formed steels.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A press-in nut that which extends in an axial direction and is formed as a cap nut and for press-fitting into a component, the press-in nut comprising:
    a nut body with a through hole, which is closed by a cap under formation of a blind hole, wherein the nut body has a bottom for support on the component, and wherein on the bottom ribs are formed for anti-twist protection; and
    a ring collar arranged on a top of the nut body, wherein the ring collar is bent only at discrete points so as to form retaining lugs,
    wherein, in a pre-assembled state, the ring collar is only partially bent so that the cap on the nut body is only held captively.

2. The press-in nut according to claim 1, wherein the connection between the cap and the ring collar in the pre-assembled state is not media-tight, but at the same time the cap and the ring collar are adapted to be transferred by press-fitting into a media-tight connection in a finished state.

3. The press-in nut according to claim 1, wherein the cap is hat-shaped and has a ring flange with which it rests on the nut body, and which is held by the ring collar.

4. The press-in nut according to claim 1, wherein between adjacent retaining lugs in each case an intermediate segment of the ring collar is formed, and wherein the retaining lugs are not sheared off from these intermediate segments.

5. The press-in nut according to claim 4, wherein the retaining lugs and the intermediate segments each merge continuously into each other.

6. The press-in nut according to claim 1, wherein 3 to 10 retaining lugs are arranged evenly distributed around the circumference.

7. The press-in nut according to claim 1, wherein the nut body has a bottom, with a circumferential mounting collar, which is intended for fixing the press-in nut in the component.

8. A method for producing a press-in nut, the method comprising:
    providing the press-in nut with a nut body with a through hole and a ring collar surrounding it, and a cap for placement on the nut body, which is provided for media-tight closure of the through hole; and
    placing the cap on the nut body and then, in a first process step for forming a pre-assembled state of the press-in nut, the ring collar is only partially bent over so that the cap is only held captively on the nut body.

9. The method according to claim 8, wherein, in the first process step, the ring collar is only partially bent in the circumferential direction at discrete points with the help of a fixing die so as to form retaining lugs.

10. The method according to claim 8, wherein the counter holder has a smooth contact surface on which the bottom of the press-in nut rests.

11. The method according to claim 8, wherein, in the first process step, a forming force in the range of 5 kN to 30 kN is exerted.

12. The method according to claim 8, wherein, for forming a media-tight connection between the nut body and the cap, in a second process step, the ring collar is pressed completely circumferentially against the cap.

13. The method according to claim 12, wherein, in the first process step a first forming force and in the second process step a second forming force is exerted, wherein the second forming force is greater than the first forming force.

14. A method for producing a press-in connection, in which a pre-assembled press-in nut is pressed into a component, the pre-assembled press-in nut extending in an axial direction and is formed as a cap nut and has a nut body with a through hole, which is closed by a cap under formation of a blind hole, the method comprising:
    providing the nut body with a ring collar at a top;
    only partially bending over the ring collar in the pre-assembled state of the press-in nut so that the cap is only held captively on the nut body; and
    pressing, completely circumferentially against the cap, the ring collar with the aid of a press-in die for pressing in this pre-assembled press-in nut.

15. The method according to claim 14, wherein the ring collar is pressed against the cap when pressing the press-in nut into the component.

\* \* \* \* \*